UNITED STATES PATENT OFFICE.

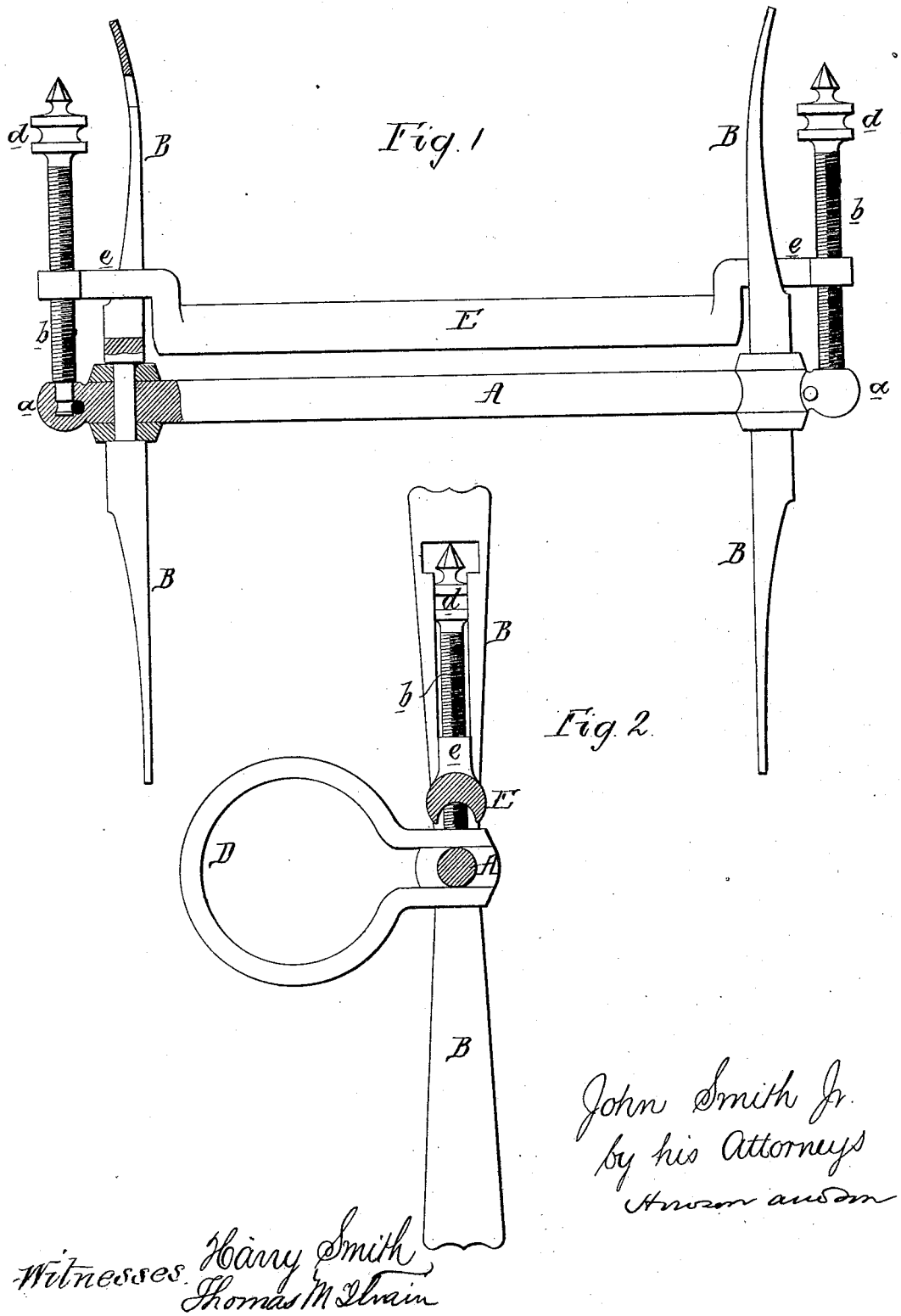

JOHN SMITH, JR., OF GLOUCESTER, NEW JERSEY, ASSIGNOR TO GEORGE A. HEYL, OF PHILADELPHIA, PENNSYLVANIA.

IMPROVEMENT IN EXPANDING BITS FOR HORSES.

Specification forming part of Letters Patent No. 167,130, dated August 24, 1875; application filed July 10, 1875.

*To all whom it may concern:*

Be it known that I, JOHN SMITH, Jr., of Gloucester, New Jersey, have invented an Expanding Bit for Horses, of which the following is a specification:

The object of my invention is to construct a bit for horses which can be expanded or contracted at pleasure; and this object I attain in a manner which I will now proceed to describe, reference being had to the accompanying drawing, in which—

Figure 1 is a front view of my expanding bit, and Fig. 2 a vertical section of the same on the line 1 2.

The bit has the usual transverse bar A, cheek-pieces B, and rings D, to which the reins are attached; but the bar A is extended beyond the pieces B at each side, so as to form a bearing, $a$, for the lower end of a screw-rod, $b$, the upper end of which is furnished with a knob, $d$, by which it can be readily turned. The screw-rods $b$ are adapted to threaded openings in the ends of projecting lugs $e$, which form part of a transverse bar, E, arranged immediately over the bar A, and having in its under edge a recess, which, when the bar E is depressed, fits snugly over the top of the bar A, the two bars, when thus in contact, being about as thick as an ordinary bar bit. The lugs $e$ of the bar E extend through slots in the cheek-pieces B, these slots extending almost to the top of the said pieces, so that the bars A and E can be separated to any desired extent.

I have discovered that a vicious or refractory disposition in a horse can be checked, without the slightest injury to the horse, by lifting the upper jaw, so that the teeth cannot be closed, and by means of the device shown and described this can be easily and readily accomplished.

I claim as my invention—

The combination, in an expanding bit, of the cross-bar A and the parallel bar E, adjustable to and from the bar A, as set forth.

In testimony whereof I have signed my name to this specification in the presence of two subscribing witnesses.

JOHN SMITH, JR.

Witnesses:
EDWARD E. ECKFELDT,
HARRY SMITH.